United States Patent [19]

Nemnich et al.

[11] Patent Number: 4,706,498

[45] Date of Patent: Nov. 17, 1987

[54] APPARATUS AND METHOD FOR MEASURING MOVEMENT

[75] Inventors: Charles L. Nemnich, Longmont; Charles D. Hoyt, Northglenn, both of Colo.

[73] Assignee: Ferrotec, Inc., Broomfield, Colo.

[21] Appl. No.: 779,284

[22] Filed: Sep. 23, 1985

[51] Int. Cl.$^4$ ............................................. G01P 15/13
[52] U.S. Cl. .................................. 73/516 R; 73/517 B; 73/654
[58] Field of Search ............. 73/516 R, 517 R, 517 B, 73/652, 654; 310/90.5

[56] References Cited

U.S. PATENT DOCUMENTS

| | | |
|---|---|---|
| 3,184,861 | 5/1965 | Conrad . |
| 3,516,294 | 6/1970 | Schmieder . |
| 3,530,727 | 9/1970 | Albert ............................... 73/516 R |
| 3,568,325 | 3/1971 | Baltz . |
| 3,604,275 | 9/1971 | Fox et al. . |
| 3,839,904 | 10/1974 | Stripling et al. . |
| 4,023,278 | 5/1977 | Hoyt . |
| 4,043,204 | 8/1977 | Hunter et al. ...................... 73/517 B |
| 4,047,439 | 9/1977 | Russell et al. ...................... 73/517 B |

OTHER PUBLICATIONS

R. E. Rosensweig, "The Fascinating Magnetic Fluids," *New Scientist* 20, Jan. 1966, pp. 146–148.
Kaiser, R. "Some Applications of Ferrofluid Magnetic Colloids," IEEE Transaction on Magnetics (Sep. 1970), pp. 694–698.
Free, J. "The Curious World of Magnetic Liquids," *Popular Science* (Feb. 1972), pp. 96–98.
"Ferrofluids, Physical Properties and Applications," publication by Ferrofluidics Corporation.
*Handbook of Measurement and Control,* pp. 12-7 to 12–10, Herceg, E. E.
Brochure, published by Sundstrand (copyrighted 1984).

*Primary Examiner*—John Chapman
*Attorney, Agent, or Firm*—Klaas & Law

[57] ABSTRACT

An accelerometer comprising a ferrofluid coated permanent magnet as a proof mass mounted for substantially friction-free movement in a hollow vessel on which vessel are mounted three coils that are used with an electrical circuit to detect and measure movement of the proof mass in response to an outside force and to return the proof mass to a null position.

15 Claims, 8 Drawing Figures

APPARATUS AND METHOD FOR MEASURING MOVEMENT

FIELD OF THE INVENTION

This invention lies generally in the field of detecting and measuring movement and is particularly directed to the detecting and measuring of movement using an accelerometer.

BACKGROUND OF THE INVENTION

The precise measurement of acceleration is a vital requirement in the navigation of land, air, and space vehicles. The exact position of any moving body can be calculated once the acceleration of that body and its starting position in three dimensions is known. The measurement of small acceleration forces (sometimes referred to as "micro-g") can be used to detect vibrations, oscillations, fracturing, cracking shifting, or movement in a wide range of materials. Numerous acceleration measurement applications exist in the fields of seismology, oil drilling bit angle control, oil pipeline integrity monitoring, robotic vehicle control, aircraft navigation systems, automotive anti-skid control, automotive air-bag deployment controls, motion sensors, oceanographic instrumentation, general purpose low-cost navigation systems, shipboard instrumentation, spacecraft control, and industrial control systems.

Accelerometers can be described as open loop, or closed loop. In open loop devices, no feedback or error signals are employed in the measurement function or in control of the proof mass. If a feedback signal representing the motion of the proof mass (an object of known weight whose motion is detected) is introduced to a position control element, then the device can be considered closed loop or servo controlled. This application is directed to closed loop accelerometers.

Several inherent limitations exist with conventional proof mass closed loop accelerometers. Measurement of very small accelerations require that the proof mass be allowed to move with minimum interference or friction from its mounting. In relative terms, a heavy proof mass and lightweight suspension or mounting provides for high sensitivity to small (usually less than 10 g-forces) acceleration. Therefore, very sensitive conventional accelerometers are poorly protected from large shock impulses, giving them a limited acceleration measurement range, and make them susceptible to serious damage from shock or vibration.

If the mechanical suspension system of a conventional accelerometer involves a spring, flexure, vane, or other element which can be characterized by a spring constant, then the natural frequency of the spring/mass system determines the frequency response of the accelerometer. For this reason, accelerometer designers routinely must tradeoff performance parameters, such as frequency response vs. ruggedness, and accuracy vs. range.

Many high performance accelerometers contain delicate mechanical components such as precision flexures, jewelled pivots, and gimbals. Use of these components result in the cost of the accelerometer being quite high, and the fragility great.

Another performance variable which affects accelerometers called "cross-axis sensitivity" occurs when a force is applied to an accelerometer in its non-sensitive axis, but results in a false reading or error in the sensitive axis measurement. This can occur in many accelerometers employing spring, coil, reed, vane, or flexure suspensions in which the proof mass motion is not adequately constrained to its sensitive axis.

BRIEF DESCRIPTION OF THE INVENTION

This invention is directed to the detecting and measuring of movement which in the preferred embodiment uses a closed loop accelerometer. The closed loop accelerometer comprises a minimum number of components and has structure which will not deteriorate from repeated use. Also, the structure is rugged and requires no expensive components.

In a preferred embodiment of the invention, the closed loop accelerometer comprises a hollow vessel having a linear extent and a generally cylindrical cross-sectional configuration. The hollow vessel is closed at each end, and the internal pressure preferably approaches a vacuum. A proof mass comprising a one piece solid mass, such as a cylindrical rod, is provided and has a linear extent substantially smaller than the linear extent of the hollow vessel and also has a generally cylindrical cross-sectional configuration. The area of the cross-sectional configuration of the proof mass is slightly less than the area of the cross-sectional configuration of the hollow vessel so that there may be relative movement between the hollow vessel and the proof mass. In this preferred embodiment of the invention, the proof mass is a permanent magnet and is coated with a ferrofluid which has excellent lubrication properties and is strongly attracted by the magnetic field of the permanent magnet. Thus, the ferrofluid fills the space between the hollow vessel and the proof mass but remains in position covering the proof mass during relative movement between the hollow vessel and the proof mass.

A control coil comprising a plurality of turns of an electrically conductive material, such as copper wire, is positioned around the outer surface of the hollow vessel. The ends of the control coil are evenly spaced from the ends of the hollow vessel. Two sensing coils, each comprising a plurality of turns of an electrically conductive material, such as copper wire, are positioned around the outer surface of the hollow vessel between the ends of the control coil and the ends of the hollow vessel.

In operation, the hollow vessel is fixedly mounted in a preselected position on the object whose acceleration is to be measured. Acceleration of the object in the direction of the sensitive axis of the device will cause relative movement between the hollow vessel and the proof mass which movement, since the proof mass is an inertial element, is the movement of the hollow vessel. This movement gradually causes one sensing coil to move over the proof mass which will result in a rise in inductance in that one sensing coil and a decrease in inductance in the other sensing coil as it moves away from the proof mass. This inductive imbalance is detected by an electronic circuit and translated into a proportional voltage which is introduced into a feedback circuit whose output is a direct current. This direct current is introduced into the control coil and is of such a polarity and magnitude that the magnetic field created in the hollow vessel produces an equal force on the proof mass in a direction opposite to the acceleration force. This application of current continues through the period of acceleration to balance the forces acting on the proof mass so that if the object is maintained under constant acceleration in a relatively steady state, the proof mass will remain at a position away from null. When the acceleration force is removed or subsides to zero g-forces, the proof mass will be returned to a null position by the same process. The magnitude and time of the current flow can be measured by a calibrated ampere meter or the voltage from the inductance measured in a manner to provide a calibrated record of the acceleration.

The accelerometer detects and measures the relative movement of the proof mass along the sensitive axis which in the preferred embodiment is the longitudinal axis of the hollow vessel. Three closed loop accelerometers having their sensitive axes located at right angles to one another. can be used to provide for the measurement of movement in any direction.

It is, therefore, an object of this invention to provide a closed loop measuring device capable of measuring a wide dynamic range while exhibiting ruggedness, low-cost, low cross-axis sensitivity and a high frequency response.

It is another object of this invention to provide a closed loop accelerometer comprising a minimum number of components and having structure which will not substantially deteriorate from the rigors of repeated use.

It is another object of this invention to provide a closed loop accelerometer using a permanent magnet as a proof mass and which is coated with a ferrofluid for substantially friction-free movement by levitation.

Additional objects, advantages and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

DETAILED DESCRIPTION OF THE INVENTION

Figure 1:
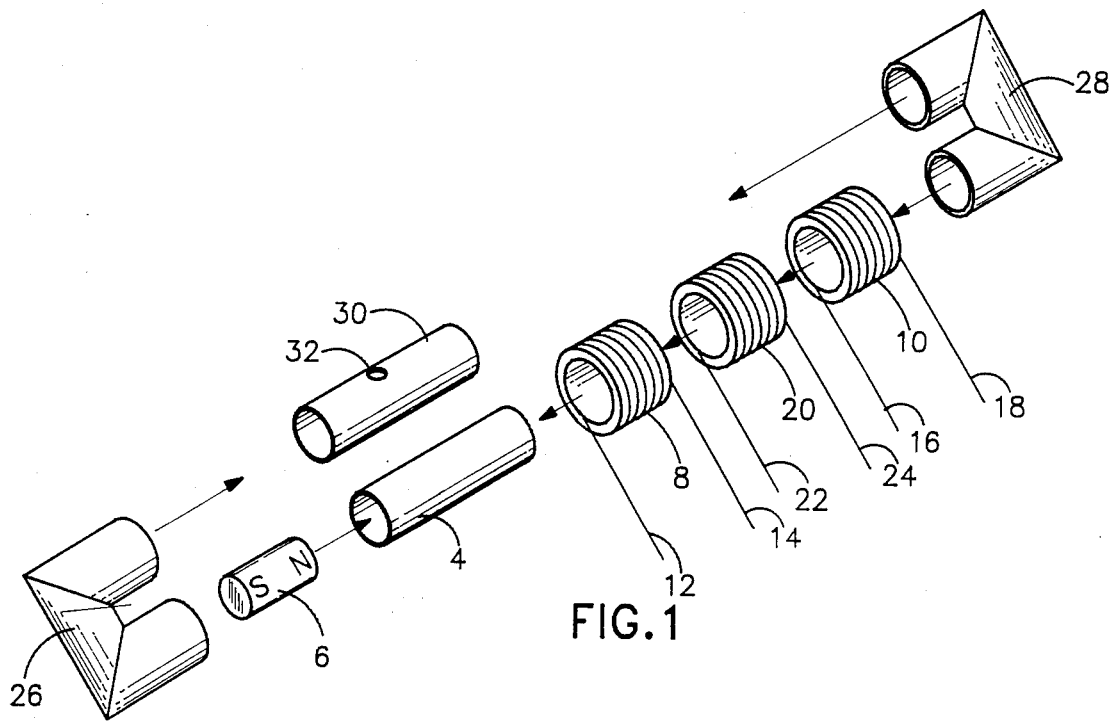
FIG. 1 is an exploded pictorial view of one embodiment of the invention.
Figure 2:
FIG. 2 is an assembled pictorial view of the embodiment in FIG. 1.
Figure 2:
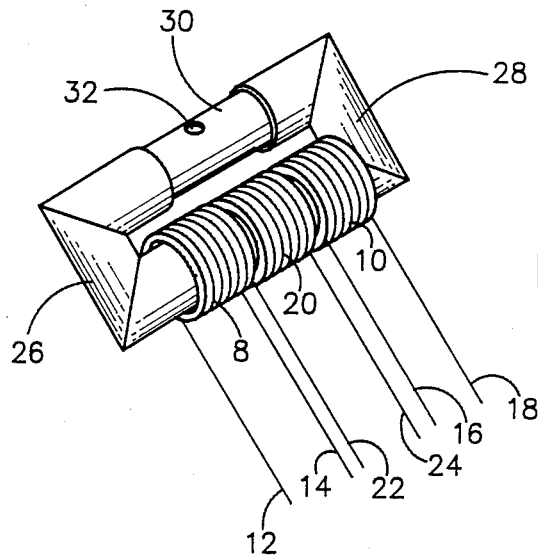

A preferred embodiment of the invention is illustrated in FIGS. 1 and 2 of the drawing and comprises a measuring device 2 which in the preferred embodiment comprises brass tubing but other materials such as plastic, glass, other metals, composite or any other non-permeable raw material suitable for use in a particular environment may be used. The principal part of the measuring device 2 is a hollow vessel 4 which in FIG. 1 is cylindrical. A proof mass 6, comprising a rod, which preferably is cylindrical and a permanent magnet 6, has an outer diameter slightly less than the inner diameter of the hollow vessel 4 so that the proof mass may be inserted into the hollow vessel 4. The proof mass 6 has a length substantially less than the length of the hollow vessel 4. In the preferred embodiment, the proof mass 6 has a length equal to about one-third the length of the hollow vessel 4. If desired, the proof mass 6 may be a hollow cylindrical tube.

Two sense coils 8 and 10 comprising a plurality of windings of an electrically conductive material, which in the preferred embodiment is copper, are provided. The sense coils 8 and 10 each have an inner diameter slightly greater than the outer diameter of the vessel 4 so that each of the sense coils 8 and 10 may be positioned over a portion of the vessel 4. A pair of electrical leads 12 and 14 are connected to the sense coil 8 and a pair of leads 16 and 18 are connected to the sens coil 10. A control coil 20 comprising a plurality of windings of an electrically conductive material which in the preferred embodiment is copper, is also provided. The control coil 20 has a diameter slightly greater than the outer diameter of the hollow vessel 4 so that the control coil may be positioned over a portion of the hollow vessel 4. In the preferred embodiment, the center of the control coil 20 coincides with the center of the vessel 4. A pair of electrical leads 22 and 24 are connected to the control coil 20 for a purpose to be described hereinafter. As illustrated in FIG. 1, the linear extent of the proof mass 6 is substantially equal to the linear extent of the control coil 20. Also, the linear extent of the proof mass 6 is substantially equal to the linear extent of each of the inductive sense coils 8 and 10.

Two U-shaped hollow tubular connectors 26 and 28 and a hollow piece of tubing 30 are provided to make the measuring device 2. The various components are assembled by inserting the proof mass 6 into the hollow vessel 4. A ferrofluid is used to coat the outer surface of the proof mass 6 so that it may have substantially friction free movement within the hollow vessel 4. The ferrofluid has excellent lubrication properties and is strongly attracted by the magnetic field of the proof mass 6 so as to remain in position covering the proof mass 6 during relative movement between the proof mass 6 and the hollow vessel 4. The preferred ferrofluids useful in the practice of the present invention can be obtained from Ferrofluidics Corporation, 40 Simon Street, Nashua, NH 03060. The sense coil 8, the control coil 20 and the sense coil 10 are then positioned over the outer surface of the hollow vessel 4 and secured thereto by suitable means such as an epoxy or other resin adhesive. As stated above, the control coil 20 is positioned so that the center of the control coil 20 coincides with the center of the hollow vessel 4. The sense coils 8 and 10 are placed on either side of and equidistant from the control coil 20 and in the preferred embodiment, illustrated in FIG. 2, the sense coils 8 and 10 and the control coil 20 are substantially in abutting relationship. One end of hollow vessel 4 and one end of the tubing 30 are positioned in and secured to the U-shaped connector 26 and the other end of the hollow vessel 4 and the other end of the tubing 30 are positioned in and secured to the U-shaped connector 28. A seal is formed at the juncture of these tubes by suitable means, such as by soldering. Means (not shown) are used to control the pressure within the measuring device 2, preferably below atmospheric, through the opening 32 in the tubing 30 which opening 32 is then sealed. While the measuring device 2 is shown as rectangular, it is understood that the connection portion comprising the U-shaped connectors 26 and 28 and the tubing 20 may be of any geometrical configuration. The only purpose of the structure is to provide atmospheric equalization from one side of the proof mass 6 in the hollow vessel 4 to the other side of the proof mass 6 in the hollow vessel 4.

Figure 3:
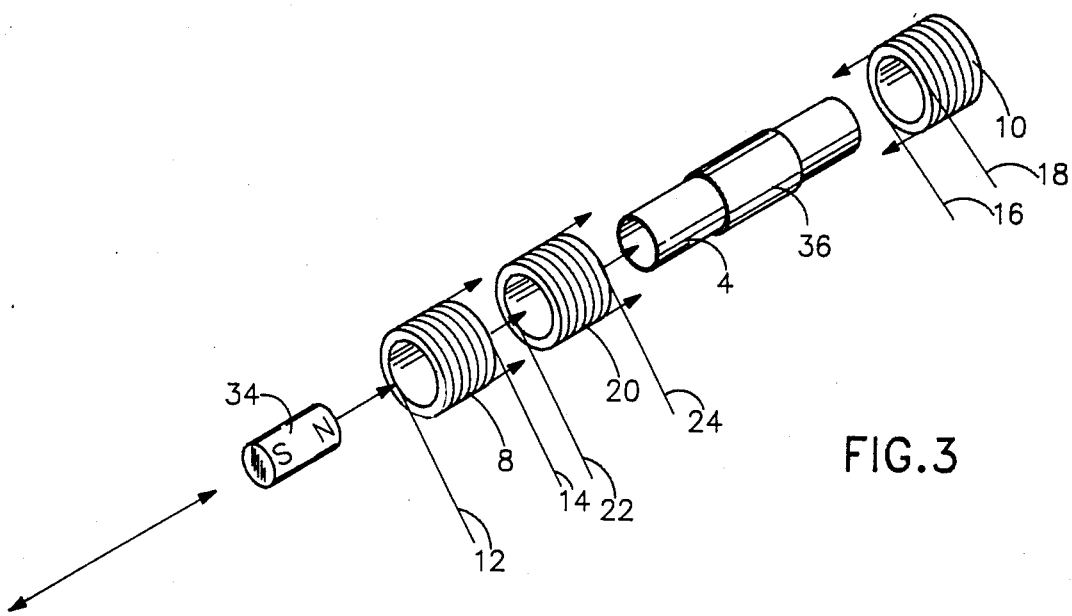
FIG. 3 is an exploded pictorial view of another embodiment of the invention.
Figure 4:
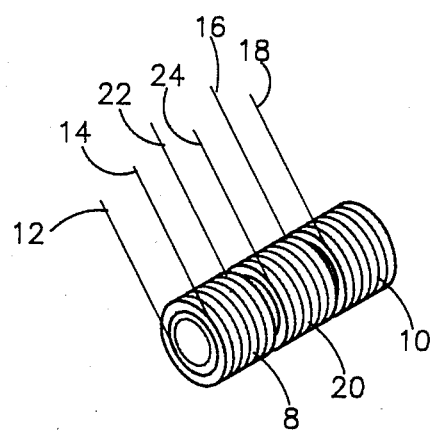
FIG. 4 is an assembled pictorial view of the embodiment in FIG. 3.

Another embodiment of the invention is illustrated in FIGS. 3 and 4 and differs from the embodiment illustrated in FIGS. 1 and 2 in that the proof mass 34 is a hollow cylindrical tube and a permeable flux concentrator 36 is secured to the outer surface of the hollow vessel 4. The measuring device 38 in FIGS. 3 and 4 is assembled by securing a seal 40 to one end of the hollow vessel 4. The embodiment illustrated in FIGS. 3 and 4 does not utilize an atmospheric equalization tube. The proof mass 34 is coated with a ferrofluid and inserted into the hollow vessel 4. The sense coils 8 and 10 and the control coil 20 are then positioned over the outer surface of the hollow vessel 4. The control coil 20 in this embodiment has an inner diameter slightly larger than the outer diameter of the permeable flux concentrator 36. However, the relative location of the control coil 20 and the sense coils 8 and 10 are the same with the center of the control coil 20 coinciding with the center of the hollow vessel 4. The linear extent of the proof mass 34 is substantially equal to the linear extent of the control coil 20 and each of the sens coils 8 and 10. Means (not shown) may then be used to form substantially a vacuum in the vessel 4 and a seal similar to the seal 40 is used to seal the other end of the hollow vessel 4.

Figure 5:
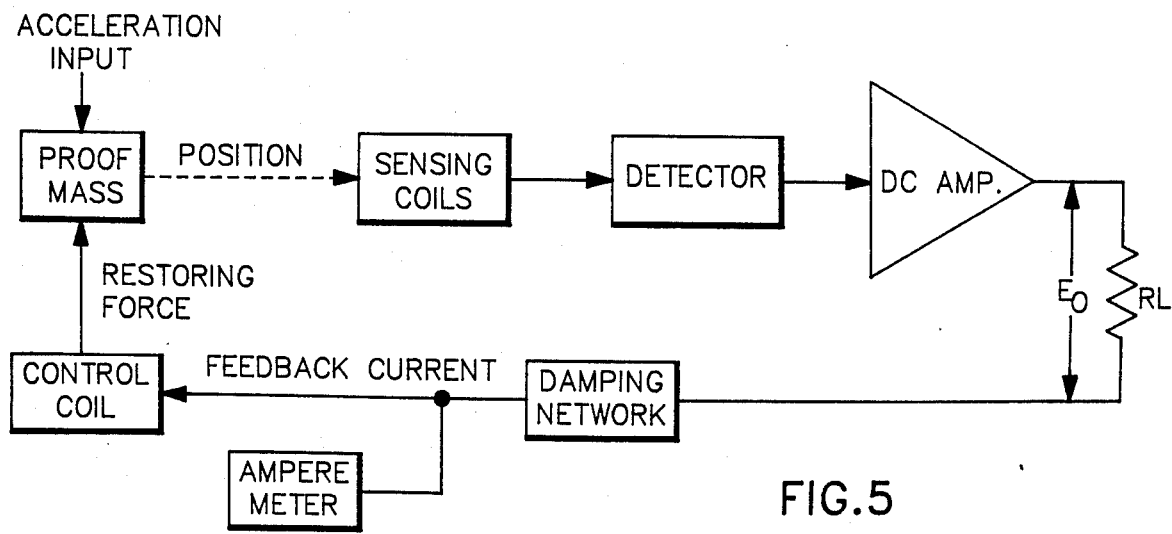
FIG. 5 is a schematic illustration of an electrical circuit useful in the practice of the invention.

In a preferred embodiment of the invention, the measuring device 2 or 38 is used as an accelerometer. The longitudinal axis of the hollow vessel 4 is the sensitive axis and the acceleration in the direction of this axis is measured by the measuring device 2 or 38. A conventional electric circuit, as illustrated in FIG. 5, is used to accomplish the measurement.

Under quiescent conditions, where no acceleration is present in the sensitive axis and the proof mass 6 or 34 is in its center (null) position, the inductance of each sense coil 8 and 10 is the same, being influenced by the proof mass 6 or 34 which is in close proximity to each sense coil 8 and 10. This is called the reference inductance. The introduction of a ferromagnetic material into close proximity to an inductive coil will increase the inductance as sensed by the circuit. Conversely, the removal of a ferromagnetic material from the close proximity of an inductive coil will decrease its inductance.

Under conditions of acceleration along the sensitive axis of the device, there will be relative movement between the proof mass 6 or 34 and the sensing coils 8 or coil 10. Since the proof mass 6 or 34 is an inertial element, this relative movement is actual movement of the hollow vessel 4. As stated above, any movement of the proof mass closer to an inductive coil will result in a rise in inductance for that coil. A decrease in inductance equal in magnitude will occur in the opposite coil. This inductive imbalance is detected, amplified, dampened and applied as a feedback current. This feedback current is introduced through leads 22 and 24 into the control coil 20 and is of such a polarity that the magnetic field created in the hollow vessel 4 by this feedback current produces a restoring force on the proof mass 6 or 34 in a direction to oppose the acceleration force which originally caused the proof mass 6 or 34 to be located off-center. The feedback amplifier continually adjusts the feedback current and therefore the restoring force to balance the acceleration force applied to the proof mass 6 in the measuring device 2 or 38. This feedback current is maintained until acceleration has stopped, at which time the proof mass will once again be centered in the vessel and the output voltage of the sen ing circuit will again be zero. The magnitude and direction of the acceleration experienced by the device is directly proportional to the magnitude and opposite in direction to the restoring force created by the feedback current. The acceleration measurement is then made by a conventional calibrated ampere meter. Alternatively, the feedback current can be allowed to flow through a precision resistance, thereby providing for the use of a calibrated voltage meter to measure acceleration.

The size of the various components can be varied according to the intended use. In one embodiment the hollow vessel 4 is of the type illustrated in FIGS. 3 and 4 and has an inner diameter of about 0.250 inches and a wall thickness of about 0.015 inches and a length of about 2.0 inches. The proof mass is a cylindrical rod as illustrated in FIG. 1. The outer diameter of the proof mass 6 is about 0.246 inches With the thickness of the ferrofluid coating on the proof mass 6 being 0.002 inches. The proof mass 6 has a length of about 0.60 inches. The proof mass 34 has a wall thickness of about 0.075 inches. The coils 8, 10 and 20 each comprise windings using a number 44 gauge copper magnet wire with nylon insulation. Each coil contains one thousand five hundred turns and has an inner diameter of about 0.280 inches. The preferred ferrofluid is a ferrofluid marketed by Ferrofluidics Corporation under the catalogue number EMG 9035500g.

Figure 6:
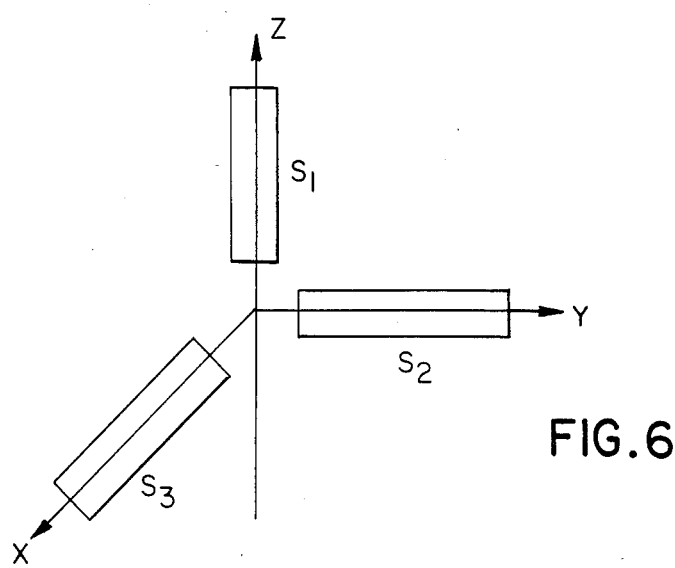
FIGS. 6 and 7 are a schematic illustration depicting the use of the invention for measuring movement in three perpendicular directions.
Figure 7:
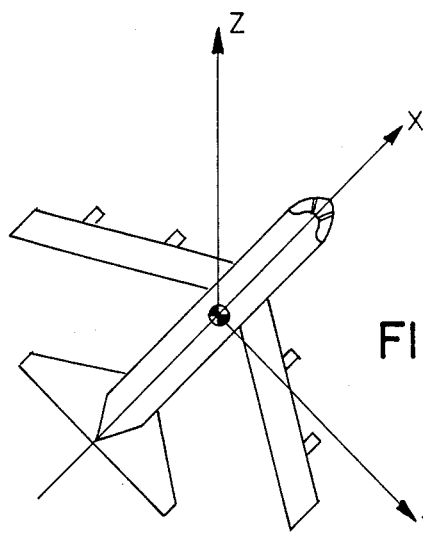

The measuring device 2 or 38 constitutes one axis of acceleration measurement. Three such measuring devices, having their sensitive axes placed at right angles to one another, can be constructed in one housing to provide a full three axis measuring capability. An embodiment of this type is illustrated in an airplane in FIGS. 6 and 7 having measuring devices S1, S2 and S3. S1 measures acceleration in the Z axis (vertical); S2 measures acceleration in the Y axis (latitudinal); and S3 measures acceleration in the X axis (longitudinal).

Figure 8:
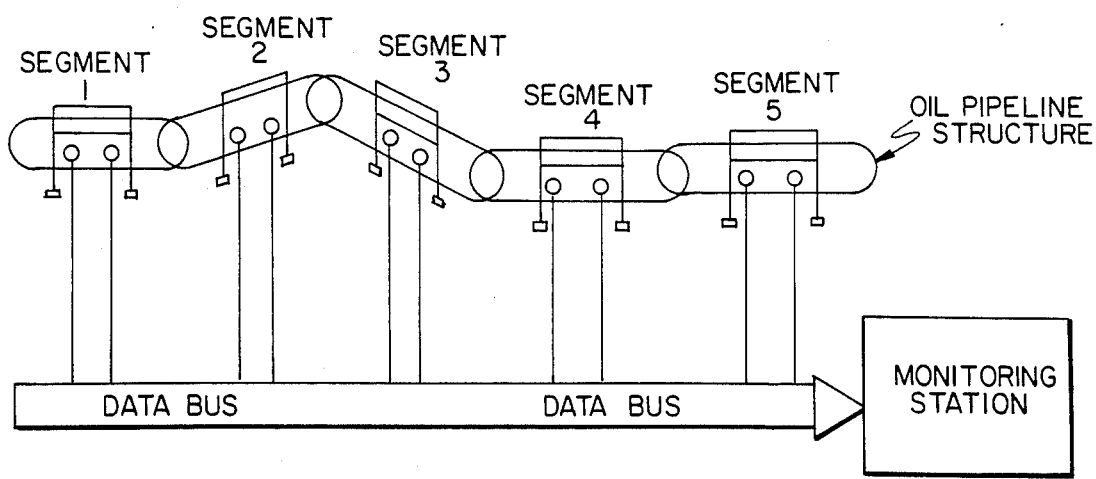
FIG. 8 is a schematic illustration depicting the use of the invention for monitoring an oil pipeline.

Another use of the measuring device is illustrated in FIG. 8 wherein a plurality of measuring devices are used to monitor different segments 1-5 of a structure such as an oil pipeline. The measuring devices would detect movement of each segment from such things as earthquakes, cracking, settling, landslides, terrorist activity, rupture or other similar things. Such detection could be fed into a data bus and generate a signal to a monitoring station.

It is contemplated that the inventive concepts herein described may be variously otherwise embodied and it is intended that the appended claims be construed to include alternative embodiments of the invention except insofar as limited by the prior art.

What is claimed is:

1. A measuring apparatus comprising:
   a hollow vessel having an inner surface with a predetermined cross-sectional configuration;
   a one piece solid mass comprising a permanent magnet and having an outer surface with a cross-sectional configuration substantially the same as said cross-sectional configuration of said hollow vessel and located within said hollow vessel;
   said cross-sectional configuration of said one piece solid mass having an area slightly less than the area of said cross-sectional configuration of said hollow vessel;

friction reducing means comprising a coating of a friction reducing material completely covering said outer surface of said one piece solid mass and united thereto for movement therewith and said coating being in complete surface contact with adjacent portions of said inner surface of said hollow vessel for permitting substantially friction free movement of said one piece solid mass in said hollow vessel;

resistance reducing means for reducing any resistance to movement of said one piece solid mass in said hollow vessel comprising atmospheric equalization means exterior of said hollow vessel for providing atmospheric equalization from one side of said one piece solid mass in said hollow vessel to the other side of said one piece solid mass in said hollow vessel;

electrical means for acting on said one piece solid mass to locate said one piece solid mass at a null position in said hollow cylinder;

detecting means for detecting any relative movement between said hollow vessel and said one piece solid mass in response to a force applied to said hollow vessel so that said one piece solid mass is not located at said null position; and measuring means for measuring said relative movement and for producing and exerting an equal force on said one piece solid mass in a direction opposite to the direction of said relative movement.

2. Apparatus as in claim 1 wherein said coating comprises:
a ferrofluid.

3. Apparatus as in claim 1 and further comprising:
at least one portion of said hollow vessel extending in a linear direction; and
said one piece solid mass having a linear extent substantially less than the linear extent of said one portion of said hollow vessel.

4. Apparatus as in claim 3 wherein said electrical means comprises:
an inductive control coil surrounding a central portion of said one portion of said hollow vessel.

5. Apparatus as in claim 4 and further comprising:
a permeable flux concentrator sandwiched between said control coil and said central portion.

6. Apparatus as in claim 4 wherein said means for detecting any movement of said one piece solid mass comprises:
a first inductive sensing coil surrounding a portion of said hollow vessel adjacent to one side of said control coil; and
a second inductive sensing coil surrounding a portion of said hollow vessel adjacent to the other side of said control coil.

7. Apparatus as in claim 6 wherein:
the inner surfaces of said central portion and said adjacent portions on said one side and said other side of said control coil of said hollow vessel are continuous and cylindrical; and
the outer surface of said one piece solid mass is cylindrical.

8. Apparatus as in claim 7 wherein said means for permitting substantially friction free movement of said one piece solid mass comprises:
a coating of a ferrofluid on said one piece solid mass.

9. Apparatus as in claim 8 wherein:
the linear extent of said one piece solid mass is substantially equal to the linear extent of said inductive control coil.

10. Apparatus as defined in claim 9 wherein:
the linear extent of said one piece solid mass is substantially equal to the linear extent of each of said first and second inductive sensing coils.

11. Apparatus as in claim 8 wherein said means for producing and exerting a force on said one piece solid mass comprises:
means for detecting an inductive imbalance;
means for generating an error signal in response to said inductive imbalance; and
means responsive to said error signal to send a current through said control coil to create a magnetic field to exert a force on said one piece solid mass in a direction opposite to the direction of said relative movement.

12. Apparatus as in claim 8 and further comprising:
a plurality of hollow vessels, each having a one piece solid mass mounted for substantially friction free movement therein;
said movement of each of said one piece solid masses is linear and along a sensitive axis of each of said hollow vessels; and
the sensitive axis of each hollow vessel having an angular relationship with the sensitive axis of another hollow vessel.

13. Apparatus as in claim 12 wherein:
said plurality of hollow vessels comprises three; and
said angular relationship is 90°.

14. A measuring apparatus comprising:
a hollow vessel having an inner surface with a predetermined cross-sectional configuration;
a one piece solid mass comprising a permanent magnet and having an outer surface with a cross-sectional configuration substantially the same as said cross-sectional configuration of said hollow vessel and located within said hollow vessel;
said cross-sectional configuration of said one piece solid mass having an area slightly less than the area of said cross-sectional configuration of said hollow vessel;
friction reducing means comprising a coating of a ferrofluid for permitting substantially friction free movement of said one piece solid mass in said hollow vessel;
resistance reducing means for reducing any resistance to movement of said one piece solid mass in said hollow vessel;
at least one portion of said hollow vessel extending in a liner direction;
said one piece solid mass having a linear extent substantially less than the linear extent of said one portion of said hollow vessel;
electrical means comprising an inductive control coil surrounding a central portion of said one portion of said hollow vessel for acting on said one piece solid mass to locate said one piece solid mass at a null position in said hollow cylinder;
detecting means for detecting any relative movement between said hollow vessel and said one piece solid mass in response to a force applied to said hollow vessel so that said one piece solid mass is not located at said null position comprising:
a first inductive sensing coil surrounding a portion of said hollow vessel adjacent to one side of said inductive control coil; and a second inductive sensing coil surrounding a portion of said hollow vessel adjacent to the other side of said inductive control coil;

measuring means for measuring said relative movement and for producing and exerting an equal force on said one piece solid mass in a direction opposite to the direction of said relative movement;

a permeable flux concentrator sandwiched between said control coil and said central portion;

the inner surface of said one portion of said hollow vessel is cylindrical;

the outer surface of said one piece solid mass is cylindrical;

the linear extend of said one piece solid mass is substantially equal to the linear extent of said inductive control coil; and said one piece solid mass comprises a hollow cylinder to provide said resistance reducing means.

15. A measuring apparatus comprising:

a hollow vessel having an inner surface with a predetermined cross-sectional configuration;

a one piece solid mass comprising a premanent magnet and having an outer surface with a cross-sectional configuration substantially the same as said cross-sectional configuration of said hollow vessel and located within said hollow vessel;

said cross-sectional configuration of said one piece solid mass having an area slightly less than the area of said cross-sectional configuration of said hollow vessel;

friction reducing means comprising a coating of a friction reducing material completely covering said outer surface of said one piece solid mass for movement therewith and in substantially complete surface contact with adjacent portions of said inner surface of said hollow vessel for permitting substantially friction free movement of said one piece solid mass in said hollow vessel;

resistance reducing means for reducing any resistance to movement of said one piece solid mass in said hollow vessel comprising a substantially complete vacuum in said hollow vessel;

electrical means for acting on said one piece solid mass to locate said one piece solid mass at a null position in said hollow cylinder;

detecting means for detecting any relative movement between said hollow vessel and said one piece solid mass in response to a force applied to said hollow vessel so that said one piece solid mass is not located at said null position; and measuring means for measuring said relative movement and for producing and exerting an equal force on said one piece solid mass in a direction opposite to the direction of said relative movement.

* * * * *